US011611502B2

(12) United States Patent
Srinivasa Murthy et al.

(10) Patent No.: US 11,611,502 B2
(45) Date of Patent: Mar. 21, 2023

(54) NETWORK LATENCY MEASUREMENT AND ANALYSIS SYSTEM

(71) Applicant: eBay Inc., San Jose, CA (US)

(72) Inventors: Ashok Srinivasa Murthy, Fremont, CA (US); Sunny Rameshkumar Gurnani, Fremont, CA (US)

(73) Assignee: eBay Inc., San Jose, CA (US)

( * ) Notice: Subject to any disclaimer, the term of this patent is extended or adjusted under 35 U.S.C. 154(b) by 53 days.

(21) Appl. No.: 16/909,797

(22) Filed: Jun. 23, 2020

(65) Prior Publication Data

US 2020/0322253 A1 Oct. 8, 2020

Related U.S. Application Data

(63) Continuation of application No. 16/244,363, filed on Jan. 10, 2019, now Pat. No. 10,735,307.

(51) Int. Cl.
*H04L 12/727* (2013.01)
*H04L 45/121* (2022.01)
*H04L 45/302* (2022.01)
*H04L 43/0852* (2022.01)
*H04L 45/00* (2022.01)
*H04L 41/22* (2022.01)

(52) U.S. Cl.
CPC ............ *H04L 45/121* (2013.01); *H04L 41/22* (2013.01); *H04L 43/0852* (2013.01); *H04L 45/14* (2013.01); *H04L 45/22* (2013.01); *H04L 45/302* (2013.01)

(58) Field of Classification Search
CPC .............. H04L 45/121; H04L 45/302; H04L 43/0852; H04L 45/14; H04L 41/22; H04L 45/22; H04L 41/0246; H04L 41/14; H04L 43/067
See application file for complete search history.

(56) References Cited

U.S. PATENT DOCUMENTS

| 7,039,916 B2 | 5/2006 | Jason, Jr. |
| 8,495,170 B1 | 7/2013 | Vosshall et al. |
| 8,966,066 B2 | 2/2015 | Luna et al. |

(Continued)

OTHER PUBLICATIONS

Amendment after Notice of Allowance Under 37 CFR filed on May 27, 2020 for U.S. Appl. No. 16/244,363, 10 pages.

(Continued)

*Primary Examiner* — Walli Z Butt
(74) *Attorney, Agent, or Firm* — Holland & Hart LLP

(57) ABSTRACT

Deploying a point of presence (PoP) changes traffic flow to a cloud service provider. To determine if the PoP improves the performance of a cloud service to a client, actual network latencies between the client and the cloud service are measured. In more complex scenarios, multiple PoPs are used. The client sends multiple requests for the same content to the cloud provider. The requests are sent via different routes. The cloud provider serves the requests and collates the latency information. Based on the latency information, a route for a future request is selected, resources are allocated, or a user interface is presented. The process of determining the latency for content delivered by different routes may be repeated for content of different sizes. A future request is routed along the network path that provides the lowest latency for the data being requested.

20 Claims, 9 Drawing Sheets

(56) References Cited

U.S. PATENT DOCUMENTS

| | | | |
|---|---|---|---|
| 9,282,135 B2 | 3/2016 | L'Heureux et al. | |
| 9,712,887 B2 | 7/2017 | Myers et al. | |
| 10,735,307 B1* | 8/2020 | Srinivasa Murthy | ... H04L 45/22 |
| 2002/0138618 A1 | 9/2002 | Szabo | |
| 2003/0061356 A1* | 3/2003 | Jason, Jr. | ............ H04L 67/1001 709/227 |
| 2004/0098478 A1 | 5/2004 | Koetke et al. | |
| 2009/0063891 A1 | 3/2009 | Arimilli et al. | |
| 2012/0110171 A1 | 5/2012 | Luna et al. | |
| 2012/0311428 A1 | 12/2012 | Goedegebuure | |
| 2013/0304867 A1* | 11/2013 | Raman | ................ H04L 67/1027 709/219 |
| 2016/0294978 A1* | 10/2016 | Vosshall | ................ H04L 47/826 |
| 2017/0026496 A1* | 1/2017 | L'Heureux | ............. H04L 69/14 |
| 2017/0085620 A1 | 3/2017 | Swaminathan et al. | |
| 2017/0228354 A1* | 8/2017 | Goedegebuure | .... G06F 16/9566 |
| 2018/0123923 A1* | 5/2018 | Zhou | ..................... H04L 45/121 |
| 2020/0228437 A1 | 7/2020 | Srinivasa et al. | |

OTHER PUBLICATIONS

Notice of Allowance received for U.S. Appl. No. 16/244,363, dated Mar. 31, 2020, 8 pages.

Notice of Allowance received for U.S. Appl. No. 16/244,363, dated Jan. 21, 2020, 11 pages.

Response to Rule 312 Communication received for U.S. Appl. No. 16/244,363, dated Jun. 5, 2020, 2 pages.

Marshak et al., "Evaluating Web User Perceived Latency Using Server Side Measurements", School of Computer Science, May 2003, pp. 1-13.

Wang et al., "Estimating the Performance of Hypothetical Cloud Service Deployments: A Measurement-based Approach", Proceedings IEEE INFOCOM, Apr. 10-15, 2011, 9 Pages.

* cited by examiner

RESULTS TABLE

| CLIENT ID | ROUTE ID | DATA ID | LATENCY |
|---|---|---|---|
| 192.168.1.1 | 1 | 101 | 57 |
| 10.10.10.10 | 1 | 101 | 15 |
| 192.168.1.1 | 1 | 102 | 199 |
| 10.10.10.10 | 2 | 101 | 28 |

ROUTE MERGED RESULTS TABLE

| CLIENT ID | ROUTE ID | LATENCY 1 | LATENCY 2 |
|---|---|---|---|
| 192.168.1.1 | 1 | 57 | 199 |
| 10.10.10.10 | 1 | 15 | 205 |
| 192.168.1.1 | 2 | 80 | 98 |
| 10.10.10.10 | 2 | 40 | 28 |

DATA MERGED RESULTS TABLE

| CLIENT ID | DATA ID | LATENCY 1 | LATENCY 2 |
|---|---|---|---|
| 192.168.1.1 | 101 | 57 | 80 |
| 10.10.10.10 | 101 | 15 | 40 |
| 192.168.1.1 | 102 | 199 | 98 |
| 10.10.10.10 | 102 | 205 | 28 |

*FIG. 3*

NETWORK LATENCY MEASUREMENT AND ANALYSIS SYSTEM

CROSS REFERENCES

This application is a continuation of U.S. patent application Ser. No. 16/244,363 by Srinivasa Murthy et al., entitled "Network Latency Measurement and Analysis System," filed on Jan. 10, 2019, which is incorporated herein by reference in its entirety.

TECHNICAL FIELD

The subject matter disclosed herein generally relates to cloud computing. Specifically, in some example embodiments, the present disclosure addresses mechanisms to measure, collate, and analyze network latencies.

BACKGROUND

Latency in providing content to a client from a cloud-based service provider or a server negatively impacts the user experience. To measure the latency, the provider may include a small data object along with the content. The client notifies the provider when the data object is received, allowing the provider to determine a round-trip-time for the client.

BRIEF DESCRIPTION OF THE DRAWINGS

Some embodiments are illustrated by way of example and not limitation in the figures of the accompanying drawings.

FIG. 3 is a block diagram illustrating a database schema suitable for implementing a mechanism to measure, collate, and compare network latencies, according to some example embodiments.

DETAILED DESCRIPTION

Figure 1:
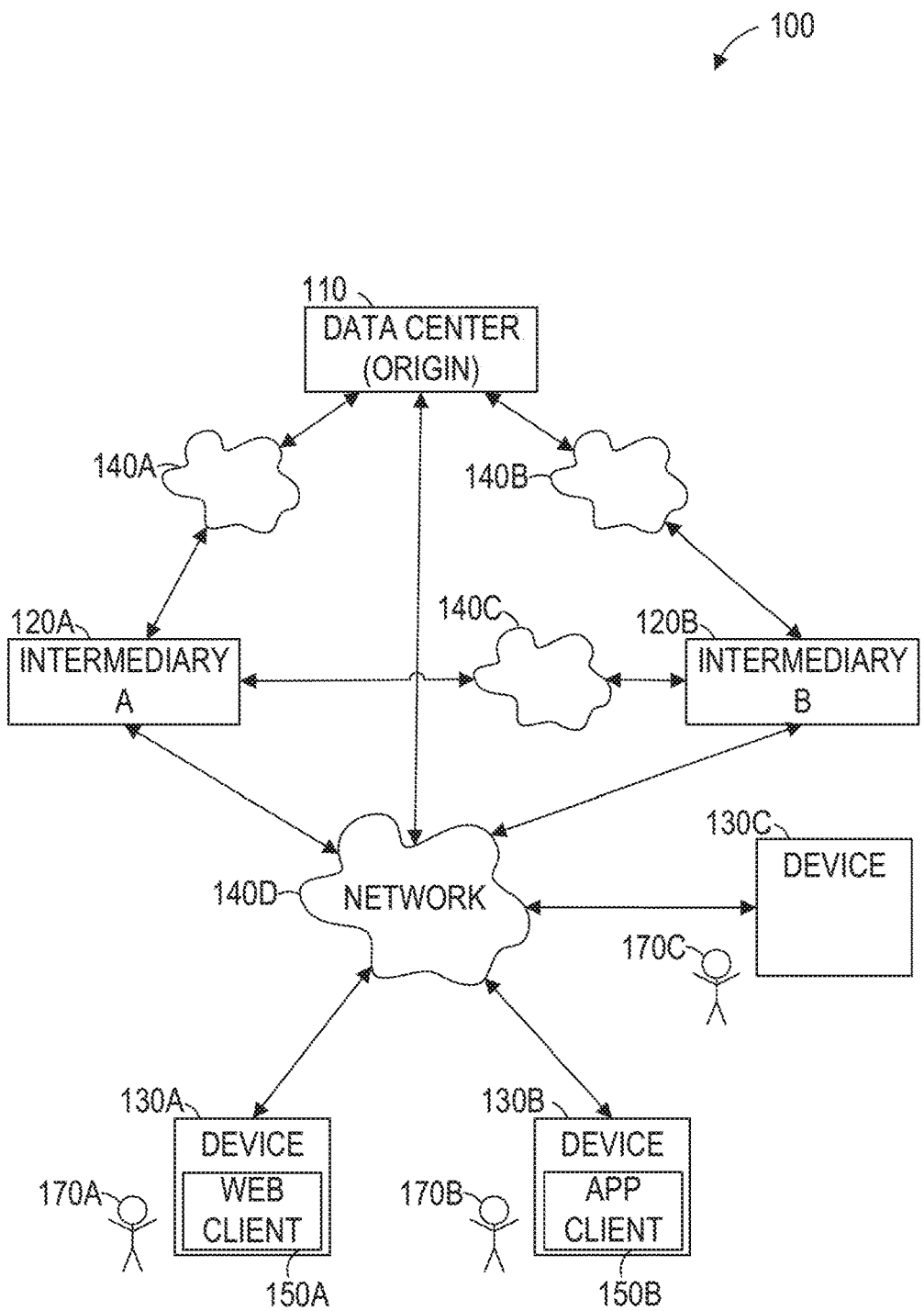
FIG. 1 is a network diagram illustrating a network environment suitable for implementing a mechanism to measure, collate, and compare network latencies, according to some example embodiments.

Example methods and systems are directed to measuring, collating, and comparing network latencies. The results of the measuring and analyzing may be used to route network traffic and to generate user interfaces for monitoring network latencies. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Deploying a point of presence (PoP) changes traffic flow to a cloud service provider and incurs costs. To determine if the PoP improves the performance of a cloud service to a client, actual network latencies between the client and the cloud service are measured. In more complex scenarios, multiple PoPs are used.

In some example embodiments, the client executes a script to cause multiple requests to be sent for the same content to the cloud provider. The requests are sent via different routes but include a common identifier. The cloud provider serves the requests and collates the latency information based on the common identifier. Based on the latency information, a route for a future request may be selected, resources may be allocated, a user interface may be presented, or any suitable combination thereof.

Latency depends not only on the route but also on the size of the requested data. The process of determining the latency for content delivered by different routes may be repeated for content of different sizes. Thus, a future request may be routed along the network path that provides the lowest latency for the data being requested.

Technical problems exist with respect to measuring, collating, and comparing network latencies. The systems and methods described herein seek to address these problems by making use of the resources of a client to transmit requests for content along multiple routes while identifying the requests with a common identifier. As a result of this technical improvement, latency in serving the requests by different routes is measured and allows otherwise-identical requests to be compared. The comparison results allow future requests to be routed to minimize latency and improve application performance.

Additionally, computing resources may be saved by using the systems and methods described herein, which is a further technical improvement. Examples of such computing resources include processor cycles, network traffic, memory usage, data storage capacity, power consumption, and cooling capacity. As just one example, by allowing client-specific optimization of network routing, network resources will be saved that would have been consumed by non-optimal routes, saving processor cycles, memory usage, network bandwidth or other computing resources associated with handling network traffic.

FIG. 1 is a network diagram illustrating a network environment 100 suitable for measuring, collating, and comparing network latencies, according to some example embodiments. The network environment 100 includes a data center 110, intermediaries 120A and 120B, and devices 130A, 130B, and 130C communicatively coupled to each other via networks 140A, 140B, 140C, and 140D. The intermediaries 120A-120B may be collectively referred to as "intermediaries 120" or generically referred to as an "intermediary 120." The devices 130A-130C may be collectively referred to as "devices 130," or generically referred to as a "device 130." The networks 140A-140D may be collectively referred to as "networks 140" or generically referred to as a "network 140." The devices 130 may interact with the data center 110 using a web client 150A or an app client 150B. The data center 110, intermediaries 120, and the devices 130 may each be implemented in a computer system, in whole or in part, as described below with respect to FIG. 2.

The data center 110 provides a cloud-based application to other machines (e.g., the devices 130) via the networks 140. A device 130 requests data from the data center 110 either directly (e.g., via network packets addressed to the data center 110) or indirectly (e.g., via network packets addressed to an intermediary 120). Using an intermediary 120 may be faster if, for example, the intermediary 120 is geographically closer to the device 130 and the data requested from the data center 110 has been cached on the intermediary 120. As another example, using the intermediary 120A may be faster if a higher-speed connection (e.g., a leased line) exists between the data center 110 and the intermediary 120A over the network 140A, the intermediary 120A has low latency to the device 130A via the network 140D, and the data center 110 has high latency to the device 130A via the network 140D.

As described herein, the web client 150A or the app client 150B requests data from the data center 110 via multiple routes. Each request for the same data from the same client is identified by a common identifier, allowing for collation of the requests by the data center 110, the client 150, or both. Based on the collated data, future requests by the client 150 are routed (e.g., to minimize latency).

Also shown in FIG. 1 are users 170A, 170B, and 170C that may be referred to generically as "a user 170" or collectively as "users 170." Each user 170 may be a human user (e.g., a human being), a machine user (e.g., a computer configured by a software program to interact with the devices 130 and the data center 110), or any suitable combination thereof (e.g., a human assisted by a machine or a machine supervised by a human). The users 170 are not part of the network environment 100 but are each associated with one or more of the devices 130 and may be users of the devices 130 (e.g., the user 170A may be an owner of the device 130A, the user 170B may be an owner of the device 130B, and the user 170C may be an owner of the device 130C). For example, the device 130A may be a desktop computer, a vehicle computer, a tablet computer, a navigational device, a portable media device, or a smartphone belonging to the user 170A.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 2. As used herein, a "database" is a data storage resource that stores data structured as a text file, a table, a spreadsheet, a relational database (e.g., an object-relational database, a NoSQL database, a network or graph database), a triple store, a hierarchical data store, a key-value store, or any suitable combination thereof. Additionally, data accessed (or stored) via an application programming interface (API) or remote procedure call (RPC) may be considered to be accessed from (or stored to) a database. Moreover, any two or more of the machines, databases, or devices illustrated in FIG. 1 may be combined into a single machine, database, or device, and the functions described herein for any single machine, database, or device may be subdivided among multiple machines, databases, or devices.

Each network 140 may be any network that enables communication between or among machines, databases, and devices (e.g., the data center 110, the intermediaries 120, and the devices 130). Accordingly, each network 140 may be a wired network, a wireless network (e.g., a mobile or cellular network), or any suitable combination thereof. Each network 140 may include one or more portions that constitute a private network, a public network (e.g., the Internet), or any suitable combination thereof.

Figure 2:
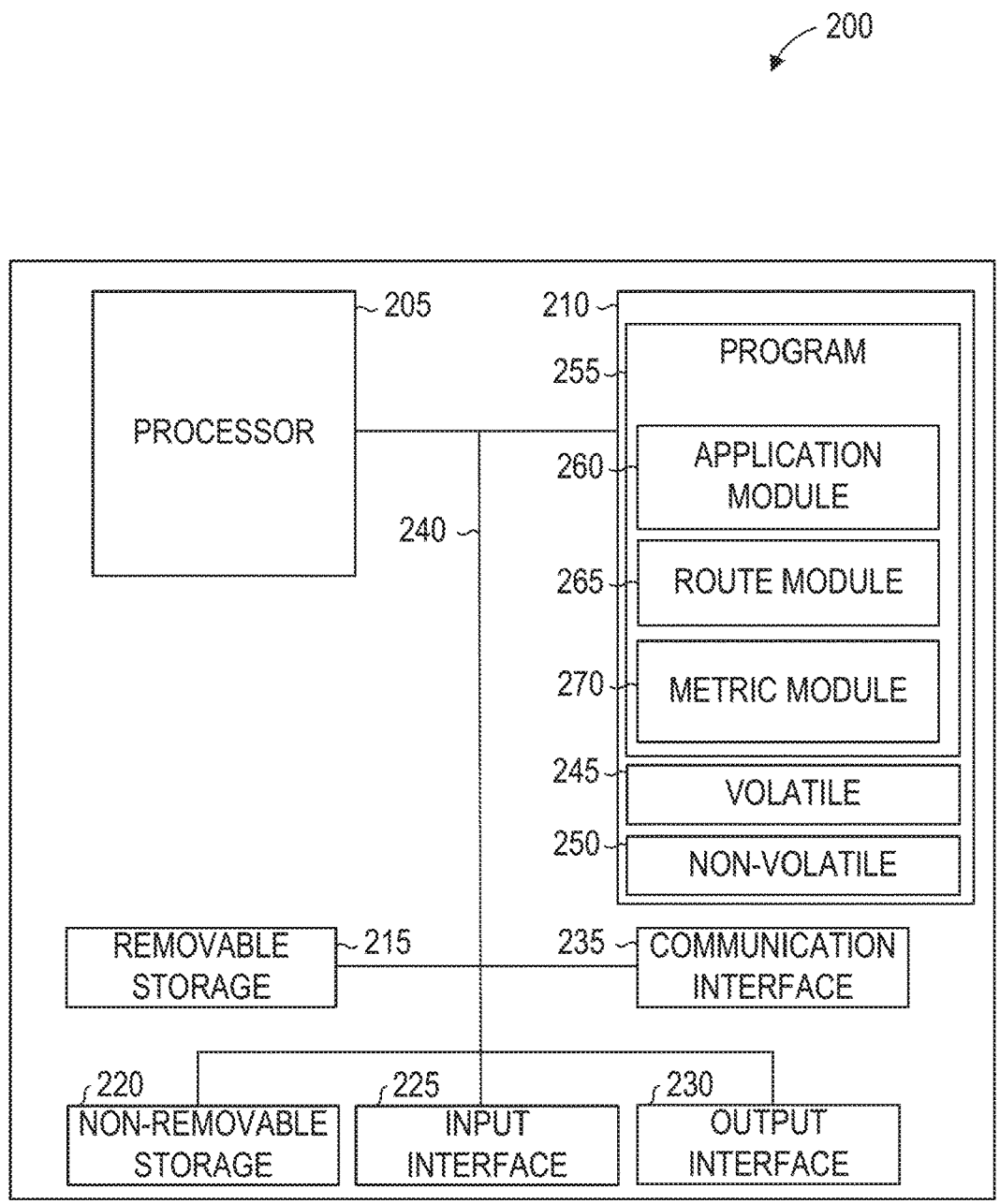
FIG. 2 is a block diagram illustrating components of a computer (e.g., a server), according to some example embodiments.

FIG. 2 is a block diagram illustrating components of a computer 200 (e.g., a server of the data center 110), according to some example embodiments. All components need not be used in various embodiments. For example, clients, servers, autonomous systems, and cloud-based network resources may each use a different set of components, or, in the case of servers for example, larger storage devices.

One example computing device in the form of the computer 200 (also referred to as a computing device 200 and a computer system 200) may include a processor 205, a computer-storage medium 210, removable storage 215, and non-removable storage 220, all connected by a bus 240. Although the example computing device is illustrated and described as the computer 200, the computing device may be in different forms in different embodiments. For example, the computing device 200 may instead be a smartphone, a tablet, a smartwatch, or another computing device including elements the same as or similar to those illustrated and described with regard to FIG. 2. Devices such as smartphones, tablets, and smartwatches are collectively referred to as "mobile devices." Further, although the various data storage elements are illustrated as part of the computer 200, the storage may also or alternatively include cloud-based storage accessible via a network, such as the Internet, or server-based storage.

The computer-storage medium 210 includes volatile memory 245 and non-volatile memory 250. The volatile memory 245 or the non-volatile memory 250 stores a program 255. The computer 200 may include, or have access to, a computing environment that includes a variety of computer-readable media, such as the volatile memory 245, the non-volatile memory 250, the removable storage 215, and the non-removable storage 220. Computer storage includes random-access memory (RAM), read-only memory (ROM), erasable programmable read-only memory (EPROM) and electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

The computer 200 includes or has access to a computing environment that includes an input interface 225, an output interface 230, and a communication interface 235. The output interface 230 interfaces to or includes a display device, such as a touchscreen, that also may serve as an input device. The input interface 225 interfaces to or includes one or more of a touchscreen, a touchpad, a mouse, a keyboard, a camera, one or more device-specific buttons, one or more sensors integrated within or coupled via wired or wireless data connections to the computer 200, and other input devices. The computer 200 may operate in a networked environment using the communication interface 235 to connect to one or more remote computers, such as database servers. The remote computer may include a personal computer (PC), server, router, network PC, peer device or other common network node, or the like. The communication interface 235 may connect to a local-area network (LAN), a wide-area network (WAN), a cellular network, a WiFi network, a Bluetooth network, or other networks.

Computer instructions stored on a computer-storage medium (e.g., the program 255 stored in the computer-storage medium 210) are executable by the processor 205 of the computer 200. As used herein, the terms "machine-storage medium," "device-storage medium," and "computer-storage medium" (referred to collectively as "machine-storage medium") mean the same thing and may be used interchangeably. The terms refer to a single or multiple storage devices and/or media (e.g., a centralized or distributed key-value store, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors 205. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

The term "signal medium" or "transmission medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and signal media. Thus, the terms include both storage devices/media and carrier waves/modulated data signals.

The program 255 may further be transmitted or received over the networks 140 using a transmission medium via the communication interface 235 and utilizing any one of a number of well-known transfer protocols (e.g., Hypertext Transfer Protocol (HTTP)). Examples of networks 140 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions for execution by the computer 200, and includes digital or analog communications signals or other intangible media to facilitate communication of such software.

The program 255 is shown as including an application module 260, a route module 265, and a metric module 270. Any one or more of the modules described herein may be implemented using hardware (e.g., a processor of a machine, an application-specific integrated circuit (ASIC), an FPGA, or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The application module 260 of a server interacts with the application module 260 of a client to provide a cloud-based application. For example, a web application is provided from the data center 110 to the device 130A running the web client 150A.

The route module 265 selects a route for data requests. The route module 265 may select the route based on latency data or be directed to select a route by the route module 265 of the data center 110. The route module 265 of the data center 110 compares latencies for a client and selects a route for a request based on the compared latencies. The metric module 270 gathers latency data to determine a metric by which routes are selected.

FIG. 3 is a block diagram illustrating a database schema 300 suitable for implementing a mechanism to measure, collate, and compare network latencies, according to some example embodiments. The database schema 300 is suitable for use by the route module 265 and the metric module 270. The database schema 300 includes a results table 310, a route merged results table 340, and a data merged results table 370. The results table 310 is defined by a table definition 320, including a client identifier field, a route identifier field, a data identifier field, and a latency field. The results table 310 includes rows 330A, 330B, 330C, and 330D. The route merged results table 340 is defined by a table definition 350, including a client identifier field, a route identifier field, a first latency field, and a second latency field. The route merged results table 340 includes rows 360A, 360B, 360C, and 360D. The data merged results table 370 is defined by a table definition 380, including a client identifier field, a data identifier field, a first latency field, and a second latency field, and includes rows 390A, 390B, 390C, and 390D.

Each of the rows 330A-330D stores information for a data item served to a client via a route. By comparison between rows for the same data item and the same client, the route with the lowest latency can be selected for use by the client. For example, rows 330B and 330D store data for different routes to transmit the data with identifier 101 to the client with identifier 10.10.10.10. Since the latency using the first route (e.g., a route directly from the data center 110) is lower than the latency using the second route (e.g., a route using the intermediary 120A), the route module 265 directs future requests by the client to be made via the first route. Further improvement is realized by using both the data identifier and the latency to select the route. For example, if the future request is for data closer in size to the data with identifier 102 than to the data with identifier 101, the lower-latency route associated with identifier 102 is selected.

Each of the rows 360A-360D stores information for multiple data items served to a client via a route. Each of the two latency fields stores a latency for a different data item served to the client via the route. The route module 265 compares, for multiple rows corresponding to multiple routes to a single client, the latency fields corresponding to the data item most similar to the data item being routed and selects the route having the lowest latency for the similar data item.

Each of the rows 390A-390D stores information for a single data item served to a client via multiple routes. Each of the two latency fields stores a latency for the data item served to the client via a different route. The route module 265 compares, for a single row corresponding to multiple routes to a single client, the latency fields and selects the route having the lowest latency. The single row selected is the row with the identifier of the client and the identifier of the data item most similar to the data item being routed.

In some example embodiments, more than two latencies are stored in each row of the route merged results table 340 or the data merged results table 370. Thus, the route merged results table 340 may be configured to store latencies for more than two data types and the data merged results table 370 may be configured to store latencies for more than two routes. The route merged results table 340 and the data merged results table 370 may be combined so that a single row for a client identifier stores latencies for each route/data type combination.

Figure 4:
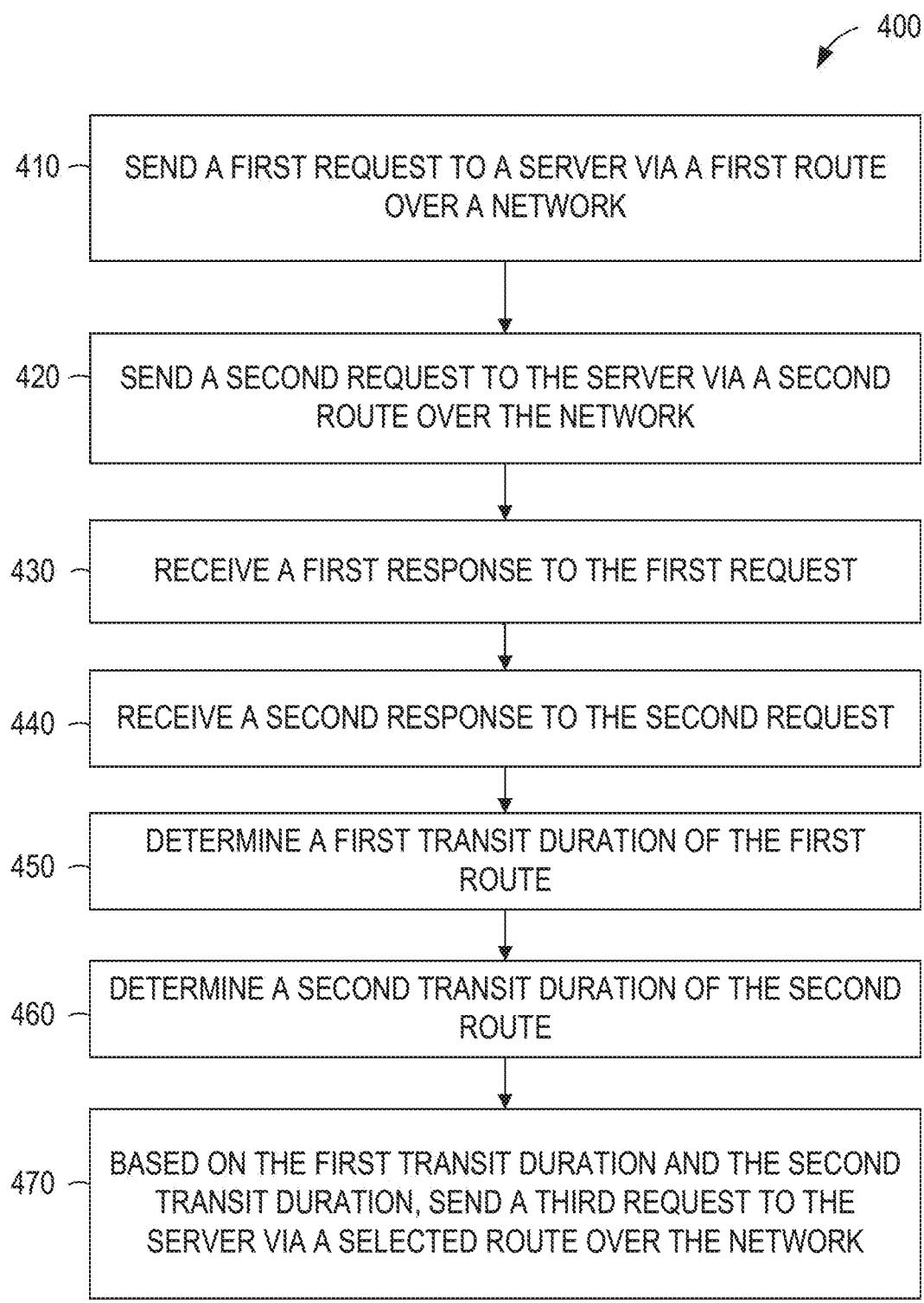
FIG. 4 is a flow diagram illustrating operations by a client device in a method of measuring and using network latencies to select a route for a request, according to some example embodiments.

FIG. 4 is a flow diagram illustrating operations by a client device in a method 400 of measuring and using network latencies to select a route for a request, according to some example embodiments. The method 400 includes operations 410, 420, 430, 440, 450, 460, and 470 and allows the client device to select a route for a third request based on transit durations of a first request and a second request. By way of example and not limitation, the method 400 is described as being performed by the systems, modules, and databases of FIGS. 1-3.

In operation 410, the application module 260 of a client device (e.g., the device 130A of FIG. 1) sends a first request to a server (e.g., the data center 110) via a first route over a network. For example, the request may be addressed to an Internet protocol (IP) address of the data center 110 and the first route may be via the network 140D. The client device stores a first time of the first request, the first time of the first request is included as data in the first request, or both.

In operation 420, the application module 260 of the client device sends a second request to the server via a second route over the network. For example, the request may be addressed to an Internet protocol (IP) address of the intermediary 120A, which will forward the request to the data center 110, and the second route may be via the networks 140A and 140D. The client device stores a second time of the second request, the second time of the second request is included as data in the second request, or both. The first and second requests may be for the same data and be identified with a common identifier.

In operation 430, the application module 260 of the client device receives a first response to the first request. The application module 260 of the client device also receives, in operation 440, a second response to the second request. The responses include the common identifier.

In operation 450, the metric module 270 of the client device determines a first transit duration of the first route (e.g., by subtracting the time at which the first request was sent from the time at which the first response was received). The metric module 270 of the client device also determines, in operation 460, a second transit duration of the second route (e.g., by subtracting the time at which the second request was sent from the time at which the second response was received).

In operation 470, the route module 265 of the client device selects, based on the first transit duration and the second transit duration, the first route or the second route and the application module 260 sends a third request to the server via the selected route over the network. In an example embodiment, the route module 265 compares the first transit duration and the second transit duration and selects the route corresponding to the shorter duration.

Thus, by use of the method 400, after sending a small number of requests to determine the network latency of different routes, the client device is able to send further requests using the lowest-latency route. As a result, latency of the cloud-based application is reduced when compared to prior art solutions that make assumptions about the network latency of different routes and, when those assumptions are incorrect, send many requests using a higher-latency route.

Figure 5:
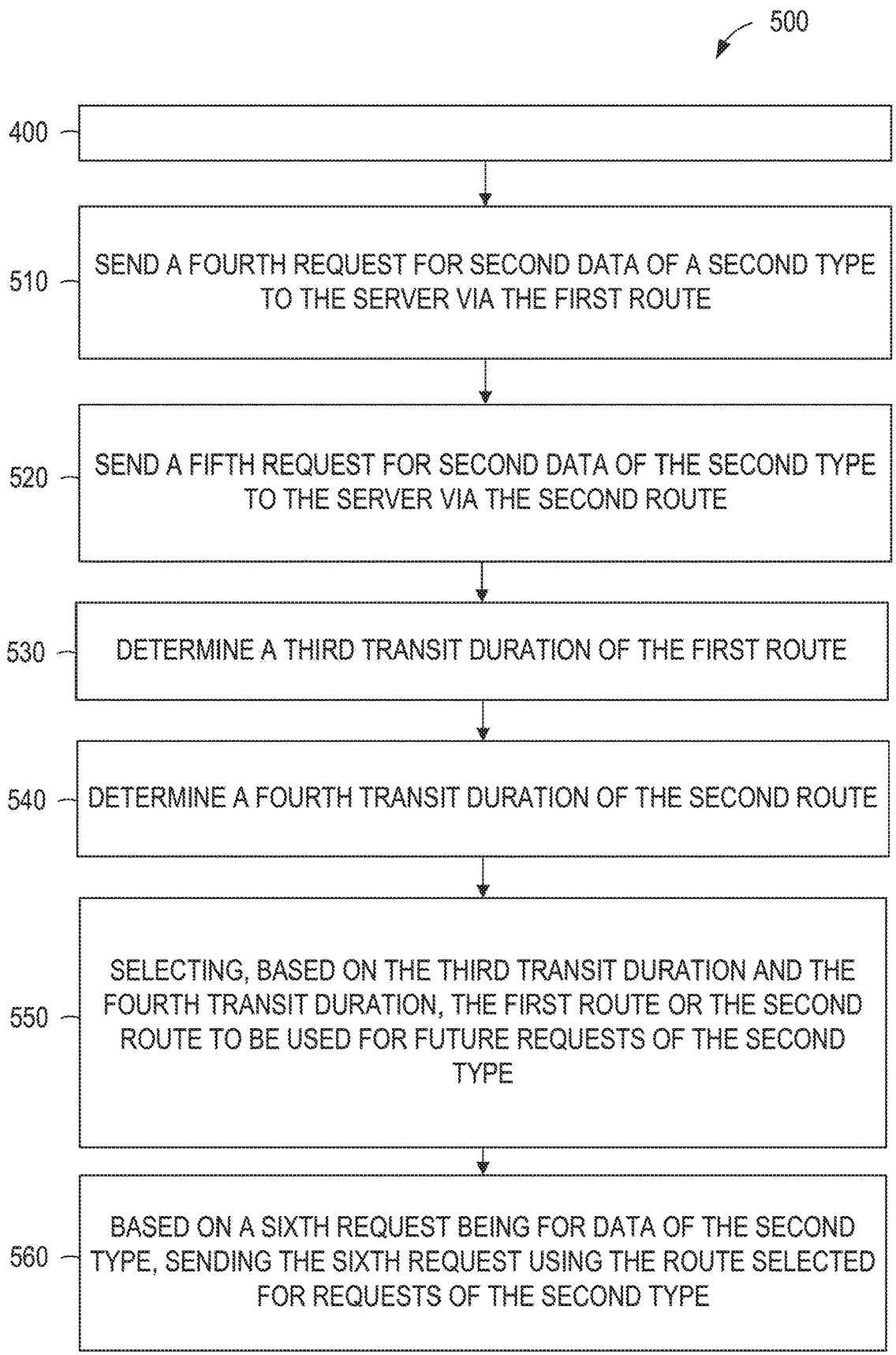
FIG. 5 is a flow diagram illustrating operations by a client device in a method of measuring and using network latencies to select a route for a request, according to some example embodiments.

FIG. 5 is a flow diagram illustrating operations by a client device in a method 500 of measuring and using network latencies to select a route for a request, according to some example embodiments. The method 500 includes the method 400 and operations 510, 520, 530, 540, 550, and 560 and may be used to enhance the method 400. By way of example and not limitation, the method 500 is described as being performed by the systems, modules, and databases of FIGS. 1-3.

In operation 510, the application module 260 of the client device sends a fourth request for second data of a second type to the server via the first route. In an example embodiment, the data requested in operation 410 is of a first size (e.g., 10 kB) and the second data of the second type requested in operation 510 is of a second size (e.g., 20 kB).

In operation 520, the application module 260 of the client device sends a fifth request for second data of the second type to the server via the second route. The fourth request and fifth request share a common identifier for the second data, different from the common identifier of the first request and the second request.

The application module 260 of the client device receives a fourth response to the fourth request and a fifth response to the fifth request. The responses include the common identifier for the second data. Thus, the client device can distinguish the responses sent by the same route based on the different identifiers of the responses and can identify the responses including the same data based on the same identifiers of the responses. The responses also include an identifier of the route (e.g., the IP address of the data center 110 or the intermediary 120A), allowing the client device to identify the route taken by each request/response.

In operation 530, the metric module 270 of the client device determines a third transit duration of the first route (e.g., by subtracting the time at which the fourth request was sent from the time at which the fourth response was received). The metric module 270 of the client device also determines, in operation 540, a fourth transit duration of the second route (e.g., by subtracting the time at which the fifth request was sent from the time at which the fifth response was received).

In operation 550, the route module 265 of the client device selects, based on the third transit duration and the fourth transit duration, the first route or the second route to be used for future requests for data of the second type. In operation 560, the route module 265 sends a sixth request using the route selected for requests of the second type based on the sixth request being for data of the second type.

In an example embodiment, the route module 265 compares the third transit duration and the fourth transit duration and selects the route corresponding to the shorter duration for requests for data of the second type. In this way, a matrix is created whereby the first and second transit durations are used to select a route for requests for data of a first type and the third and fourth transit durations are used to select a route for requests for data of a second type. Using the matrix, the transit durations for data of other types (e.g., the second type) are disregarded when routing data of a type (e.g., the first type). As a result, future requests are routed along the lowest-latency route for the specific future request, thus improving over prior art solutions that use a single route for all requests when latency is different for different requests (e.g., for requests for data of different sizes).

Though the method 500 is described as using two types of data and two routes, operations 510-540 may be repeated with appropriate modification for additional types of data and operations 510 and 530 may be repeated with appropriate modification for additional routes. Thus, the routing matrix is expanded to support an arbitrary number of routes and data types.

Figure 6:
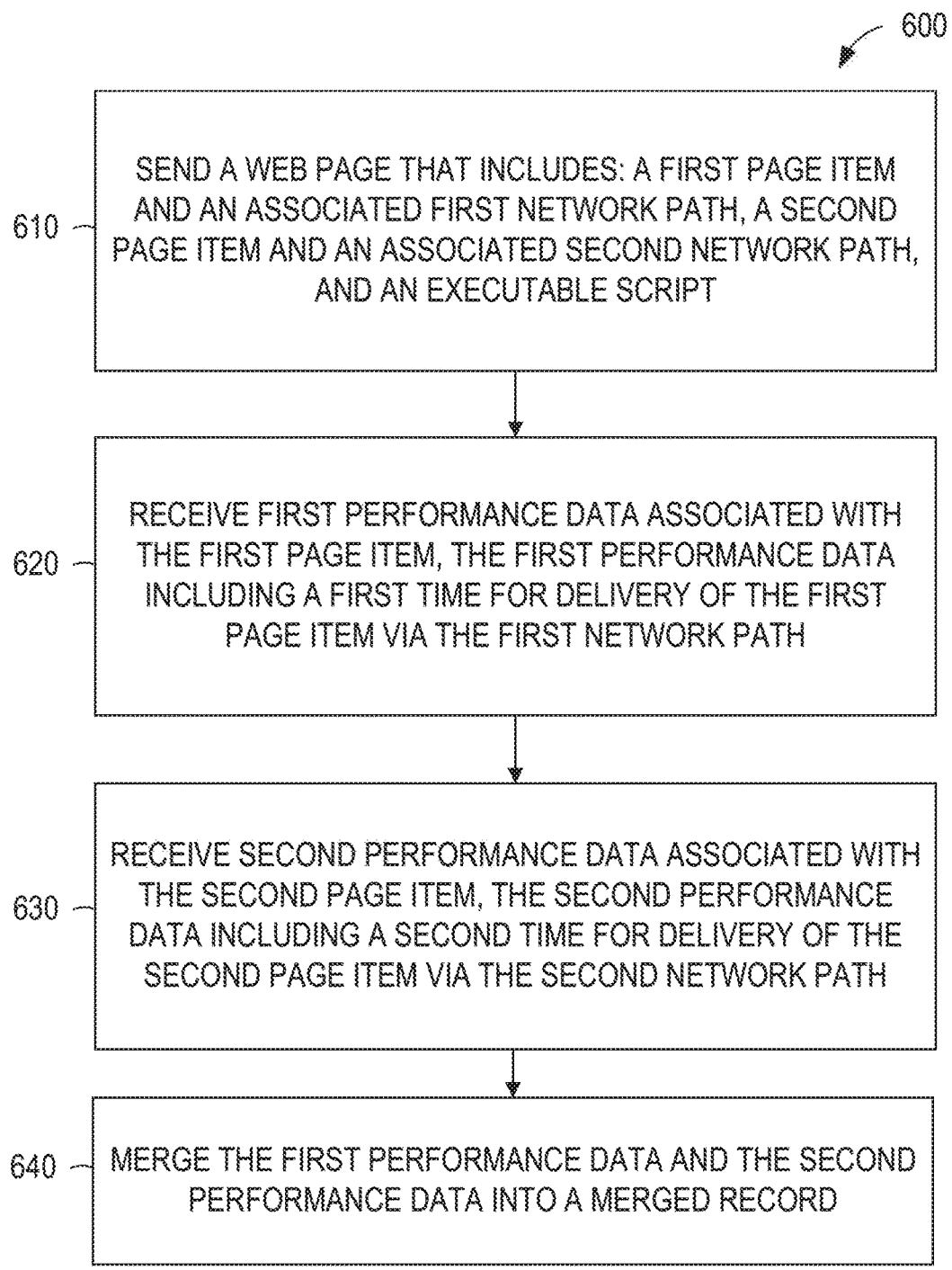
FIG. 6 is a flow diagram illustrating operations by a server in a method of measuring, collating, and comparing network latencies, according to some example embodiments.

FIG. 6 is a flow diagram illustrating operations by a server in a method 600 of measuring, collating, and comparing network latencies, according to some example embodiments. The method 600 describes operations performed by a server (e.g., the data center 110) in providing data and instructions to a client device (e.g., the device 130A) and includes operations 610, 620, 630, and 640. By way of example and not limitation, the method 600 is described as being performed by the systems, modules, and databases of FIGS. 1-3.

In operation 610, the application module 260 of a server (e.g., the data center 110) sends a web page (e.g., to the web client 150A of the device 130A) that includes a first page item and an associated first network path, a second page item and an associated second network path, and an executable script. The first page item and the second page item refer to the same data item. The client device uses the executable script to access the first page item via the first network path and the second page item via the second network path (e.g., the first device performs operations 410-460 of the method 400 in response to the web page).

In operation 620, the metric module 270 of the server receives first performance data associated with the first page item, the first performance data including a first time for delivery of the first page item via the first network path. The metric module 270 of the server, in operation 630, also receives second performance data associated with the second page item, the second performance data including a second time for delivery of the second page item via the second network path. In an example embodiment, the client device transmits the first and second transit durations determined in the method 400 to the server for receipt by the server in operations 620 and 630.

The metric module 270, in operation 640, merges the first performance data and the second performance data into a merged record. For example, a row in the data merged results table 370 may be created, indicating a latency for each of the two different routes for the same data identifier and the same client identifier.

In some example embodiments, the server generates a user interface page to display the merged record and sends the user interface page to a client device for display. The user interface page identifies the first network path, the second network path, the first performance data, and the second performance data.

Based on the first performance data and the second performance data, the server creates another web page that includes a data request using the first network path or the second network path. In an example embodiment, the route module 265 compares the first performance data and the second performance data and selects the route corresponding to the better performance (e.g., the shorter transit duration).

Thus, by use of the method 600, after causing a client to send a small number of requests to determine the network latency of different routes, the server is able to cause further requests to be sent using the lowest-latency route. As a result, latency of the cloud-based application is reduced when compared to prior art solutions that make assumptions about the network latency of different routes and, when those assumptions are incorrect, send many requests using a higher-latency route.

As described above, the method 600 uses a single data type and two routes. However, the use of additional data types, routes, or both are contemplated. Thus, as with modified versions of the method 500, the method 600 can be used to generate a routing matrix providing for route selection among an arbitrary number of routes for an arbitrary number of data types.

Figure 7:
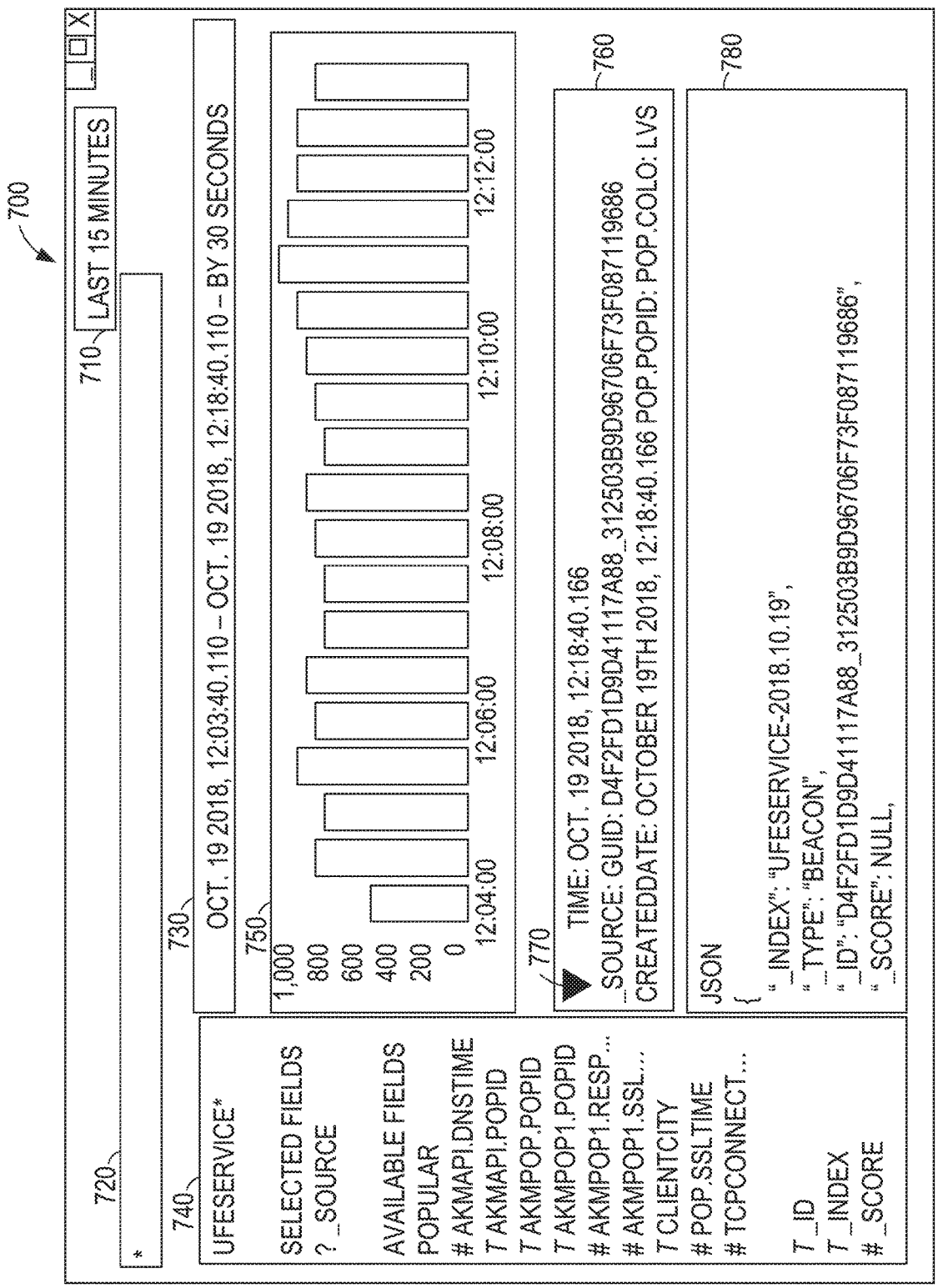
FIG. 7 is a diagram illustrating a user interface for showing results from measuring, collating, and comparing network latencies, according to some example embodiments.

FIG. 7 is a diagram illustrating a user interface 700 for showing results from measuring, collating, and comparing network latencies, according to some example embodiments. The user interface 700 includes a time period indicator 710, a search bar 720, a graph title 730, a field selector 740, a graph 750, a list view 760, an expansion control 770, and a JavaScript object notation (JSON) section 780. The user interface 700 is displayed on a display device (e.g., a screen of one of the devices 130) for monitoring of data gathered by the methods 400, 500, and 600.

The time period indicator 710 shows the time period covered by the graph 750. In some example embodiments, the time period indicator 710 is operable to cause a drop-down menu to appear, the menu operable to select a different time period. In response to selection of a different time period, the graph 750 is updated.

The search bar 720 shows the current search criteria and is operable to receive text for new search criteria. In the example shown, the search criteria is the wildcard "*", causing all records within the time period of the time period indicator 710 to be selected for use in creating the graph 750. By entering different search criteria, a subset of the available records is chosen.

The graph title 730 shows the time covered by the graph 750 and the granularity of the graph 750. In accordance with the time period indicator 710, the graph title 730 indicates that the graph 750 is for the 15 minutes ending at the time at which the graph 750 was created: Oct. 19, 2018 at 12:18:40.110.

The graph 750 shows the number of records created in each 30-second time period within the 15-minute time period covered by the graph 750. The x-axis corresponds to time and the y-axis corresponds to the number of records.

The field selector 740 is operable to select fields for view in the list view 760 and the JSON section 780. The selected field is_SOURCE, which is an object rather than a simple data type. Accordingly, the_SOURCE field name is preceded by a question mark to indicate the type object. Other fields are preceded by a pound sign to indicate that the fields contain numeric values, or a letter T to indicate that the fields contain text.

The list view 760 shows a list of the records meeting the filters specified by the time period indicator 710, the search bar 720, and the field selector 740. A row in the list view 760 is expanded by use of the expansion control 770. In the example shown, the expansion control 770 has been activated and details for the_SOURCE object (selected in the field selector 740) are shown next to the time of a record for Oct. 19, 2018, 12:18:40.166. In response to operation of the expansion control 770, the_SOURCE information is hidden and additional record times are displayed. The list view 760 is scrollable to allow additional records in the list to be displayed.

The JSON section 780 shows all fields of the record selected in the list view 760 in JSON format. The JSON section 780 is scrollable to show additional details in the record.

Figure 8:
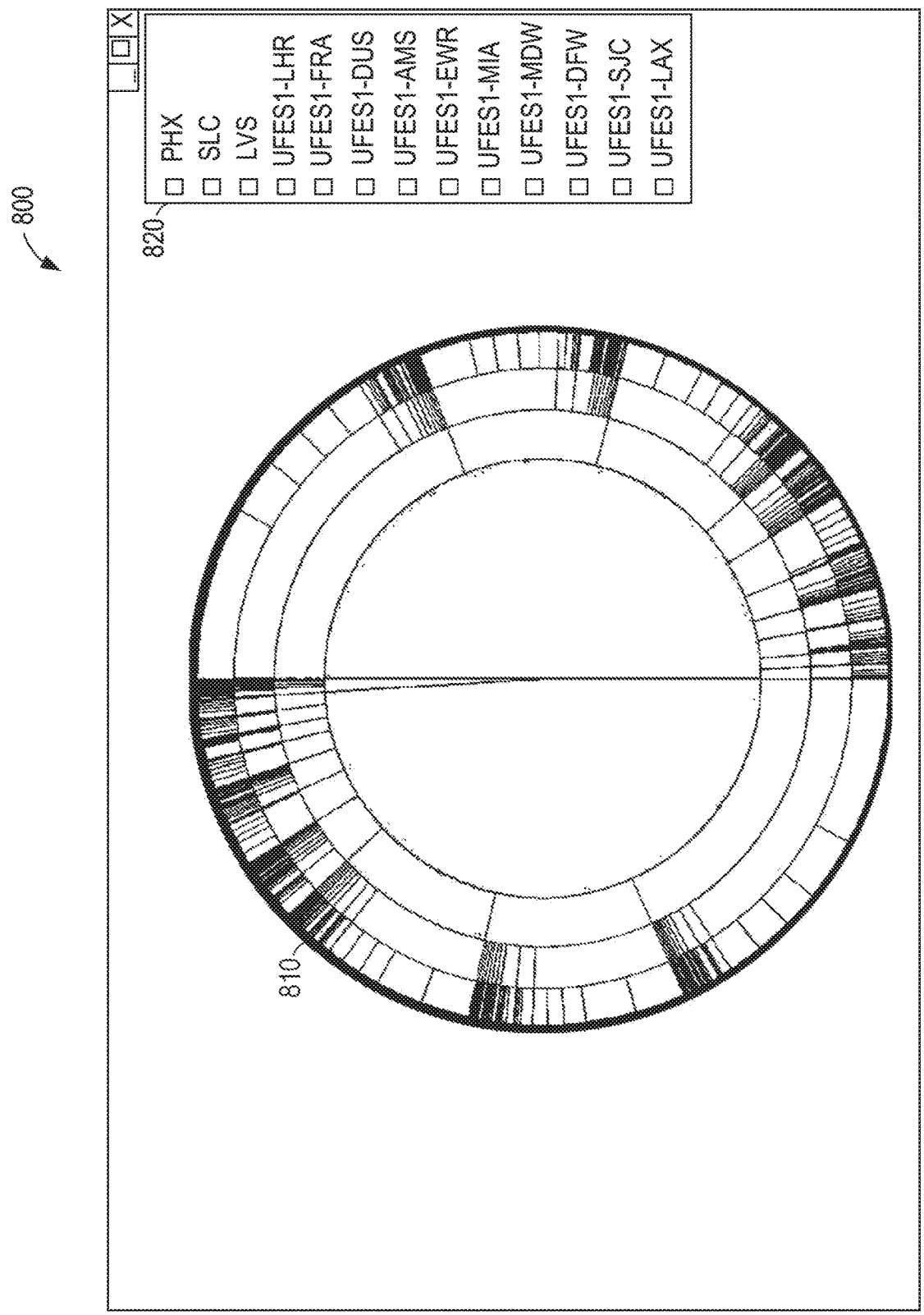
FIG. 8 is a diagram illustrating a user interface for showing results from measuring, collating, and comparing network latencies, according to some example embodiments.

FIG. 8 is a diagram illustrating a user interface 800 for showing results from measuring, collating, and comparing network latencies, according to some example embodiments. The user interface 800 includes the nested pie graph 810 and the key 820. The nested pie graph 810 includes four layers. The outermost layer shows the portion of requests originating in each city. The second layer shows the portion of requests originating in each country. The slices of the outermost layer are aligned with the slices of the second layer so that they are directly comparable. For example, the five slices of the outermost layer beginning at the top of the graph 810 and proceeding clockwise exactly align with the first slice of the second layer, showing that the traffic from the country of the first slice of the second layer originates from five cities in that country. In other countries, there are more cities of origin with smaller slices of traffic, as can be seen in the second slice of the second layer and the corresponding slices of the outermost layer.

The third layer indicates the PoP that handled the request. The innermost layer indicates the data center that handled the request. Thus, a line can be traced from any point on the edge of the nested pie graph 810 to the innermost layer to show a path taken by requests from a city to a data center. If data requests from a single city are handled by multiple PoPs or data centers, the outer two layers will have two or more slices for the city and country of origin.

Typically, the slices of the nested pie graph 810 are color coded and the key 820 indicates the color used for each city, country, PoP, or data center. For clarity, all slices are white in the FIG. 8. In the example of FIG. 8, PHX, SLC, and LVS (listed at the top of the key 820) are the names of data centers and correspond to the three slices in the center pie of the nested pie graph 810. The UFES1—entries in the key 820 are the names of PoPs. The key 820 may be scrollable, to allow the view of additional slice labels, such as countries and cities.

In some example embodiments, the slices in the graph 810 are operable to filter on the data for the slice. For example, selection of a slice in the outermost layer causes the nested pie graph 810 to be updated to include only the data generated by requests from the city corresponding to the selected slice. Thus, the outermost two layers will be solid rings, indicating traffic from a single city and country. The inner two layers will be solid rings if all traffic from the city is directed to a single data center through a single PoP, but will show the relative distribution of requests to different PoPs and data centers if that is the case. An administrator may be able to easily determine when aberrant routes are being selected using this visualization tool.

Figure 9:
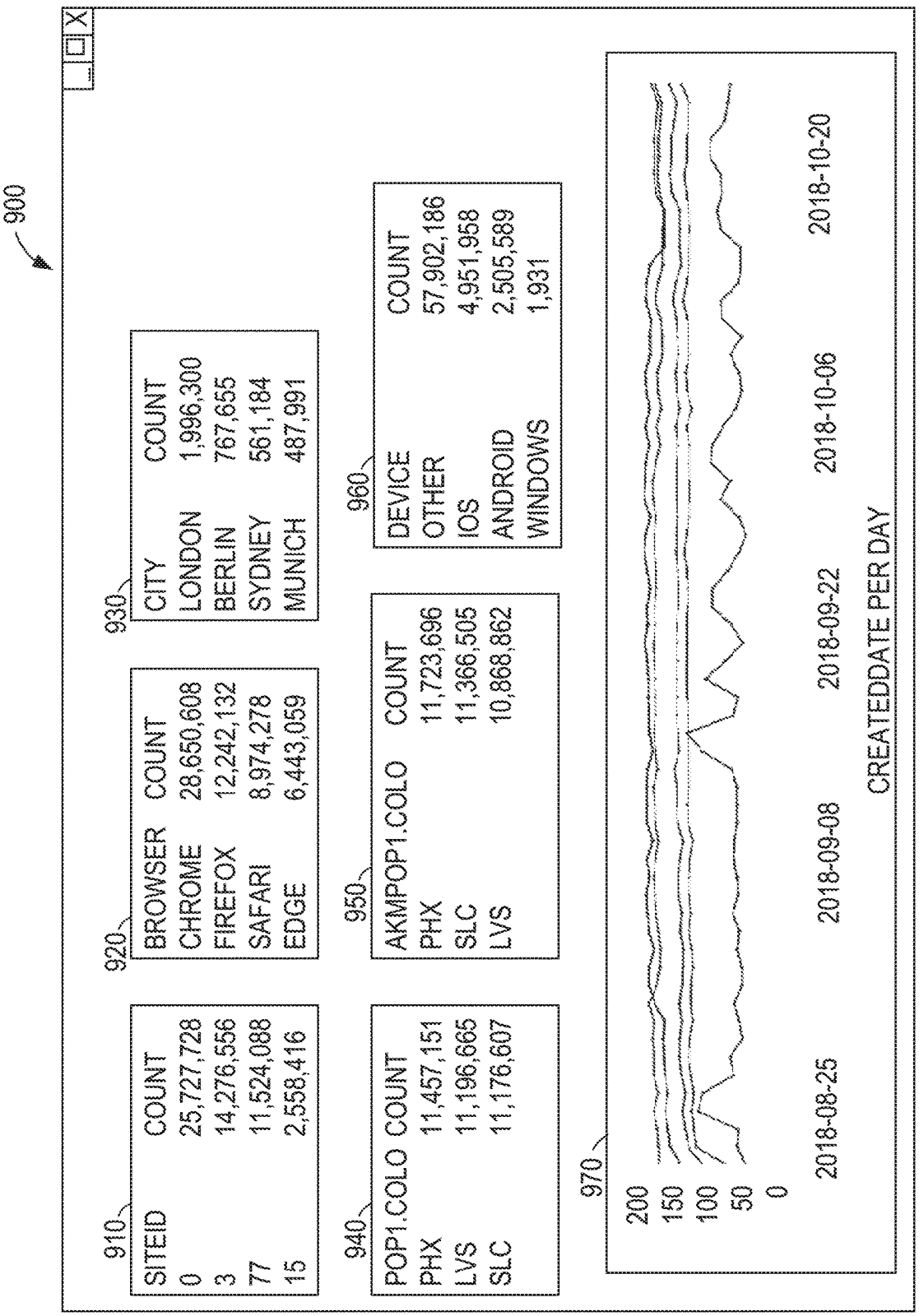
FIG. 9 is a diagram illustrating a user interface for showing results from measuring, collating, and comparing network latencies, according to some example embodiments.

FIG. 9 is a diagram illustrating a user interface 900 for showing results from measuring, collating, and comparing network latencies, according to some example embodiments. The user interface 900 includes widgets 910, 920, 930, 940, 950, and 960 as well as a graph 970. Each of the widgets 910-960 shows a count of data requests received, organized by a different data type.

The widget 910 shows a count of data requests received for each data center. The widget 920 shows a count of data requests received for each web browser. The widget 930 shows a count of data requests received for each city. The widget 940 shows a count of data requests received via each PoP. The widget 950 shows a count of data requests received via each Akamai PoP. The widget 960 shows a count of data requests received via each operating system. Other widgets may also be shown.

Selection of one of the widgets 910-960 causes the graph 970 to display data corresponding to the selected widget. For example, selection of the widget 910 causes the graph 970 to display a line for each data center. The x-axis of the graph 970 represents time and the y-axis represents the number of requests received. Thus, the user interface 900 may be used to show the relative number of requests of a city, country, PoP, data center, web browser, or operating system, allowing an administrator to quickly recognize any trends or anomalies.

The systems and methods described herein make use of the resources of a client to transmit requests for content along multiple routes while identifying the requests with a common identifier. As a result of this technical improvement, latency in serving the requests by different routes is measured and otherwise-identical requests can be compared. The comparison results allow future requests to be routed to minimize latency and improve application performance. Improved user interfaces for viewing the gathered data allow for more efficient troubleshooting of any routing problems that arise.

When these effects are considered in aggregate, one or more of the methodologies described herein may obviate a need for certain efforts or computing resources that otherwise would be involved in measuring and analyzing network latency. Additional computing resources used by one or more machines, databases, or devices (e.g., within the network environment 100) are saved by making use of the selected efficient network routes. Examples of such computing resources include processor cycles, network traffic, memory usage, data storage capacity, power consumption, and cooling capacity.

Certain embodiments are described herein as including logic or a number of components, modules, or mechanisms. Modules may constitute either software modules (e.g., code embodied on a non-transitory machine-readable medium) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Example embodiments may be implemented in digital electronic circuitry, in computer hardware, firmware, or software, or in combinations of them. Example embodiments may be implemented using a computer program product (e.g., a computer program tangibly embodied in an information carrier, e.g., in a machine-readable medium for execution by, or to control the operation of, data processing apparatus, e.g., a programmable processor, a computer, or multiple computers).

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special-purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method performed at a client device, comprising:
   sending, by the client device and at a first time, a first request via a first route over a network, the first request comprising an identifier, wherein the first request corresponds to a first type of data;
   receiving, by the client device and at a second time, a response to the first request, the response comprising the identifier;
   storing a latency value for communication of the first type of data by the client device via the first route based at least in part on a difference between the first time and the second time;
   selecting, by the client device, between the first route and a second route over the network for sending a second request that corresponds to the first type of data based at least in part on comparing the latency value of the first route with a latency value of the second route; and
   sending, by the client device, the second request via one of the first route or via the second route over the network based at least in part on the selecting.

2. The method of claim 1, further comprising:
   sending, at a third time, a third request via the second route over the network, the second request comprising the identifier; and
   receiving, at a fourth time, a response to the third request that comprises the identifier.

3. The method of claim 2, further comprising:
   determining, based at least in part on receiving the response to the third request, a difference between the third time and the fourth time.

4. The method of claim 3, wherein sending the second request via the first route or via the second route further comprises:
   sending the second request via the first route based at least in part on determining that the difference between the third time and the fourth time is greater than the difference between the first time and the second time.

5. The method of claim 3, wherein sending the second request via the first route or via the second route further comprises:
   sending the second request via the second route based at least in part on determining that the difference between the first time and the second time is greater than the difference between the third time and the fourth time.

6. The method of claim 1, further comprising:
   sending, at a third time, a third request via the first route over the network, the third request comprising a second identifier, wherein the first request is for the first type of data and the third request is for a second type of data different from the first type of data.

7. The method of claim 1, wherein the first request and the second request comprise a same type of data.

8. A client device, comprising:
   at least one processor; and
   a memory device storing instructions that, when executed by the at least one processor, cause the client device to perform operations comprising:
   sending, by the client device and at a first time, a first request via a first route over a network, the first request comprising an identifier, wherein the first request corresponds to a first type of data;
   receiving, by the client device and at a second time, a response to the first request, the response comprising the identifier;
   storing a latency value for communication of the first type of data via the first route based at least in part on a difference between the first time and the second time;
   selecting, by the client device, between the first route and a second route over the network for sending a second request that corresponds to the first type of data based at least in part on comparing the latency value of the first route with a latency value of the second route; and
   sending, by the client device, the second request via one of the first route or via the second route over the network based at least in part on the selecting.

9. The client device of claim 8, wherein the instructions are further executable to perform operations comprising:
   sending, at a third time, a third request via the second route over the network, the second request comprising the identifier; and
   receiving, at a fourth time, a response to the third request that comprises the identifier.

10. The client device of claim 9, wherein the instructions are further executable to perform operations comprising:
    determining, based at least in part on receiving the response to the third request, a difference between the third time and the fourth time.

11. The client device system of claim 10, wherein the instructions for sending the second request via the first route or via the second route are further executable to cause the client device to perform operations comprising:
    sending the second request via the first route based at least in part on determining that the difference between the third time and the fourth time is greater than the difference between the first time and the second time.

12. The client device of claim 10, wherein the instructions for sending the second request via the first route or via the second route are further executable to cause the client device to perform operations comprising:

sending the second request via the second route based at least in part on determining that the difference between the first time and the second time is greater than the difference between the third time and the fourth time.

13. The client device of claim 8, wherein the instructions are further executable to perform operations comprising:

sending, at a third time, a third request via the first route over the network, the third request comprising a second identifier, wherein the first request is for the first type of data and the third request is for a second type of data different from the first type of data.

14. The client device of claim 8, wherein the first request and the second request comprise a same type of data.

15. A non-transitory computer-readable medium comprising instructions that, when executed by at least one processor, cause a client device to perform operations comprising:

sending, by the client device and at a first time, a first request via a first route over a network, the first request comprising an identifier, wherein the first request corresponds to a first type of data;

receiving, by the client device and at a second time, a response to the first request, the response comprising the identifier;

storing a latency value for communication of the first type of data via the first route based at least in part on a difference between the first time and the second time;

selecting, by the client device, between the first route and a second route over the network for sending a second request that corresponds to the first type of data based at least in part on comparing the latency value of the first route with a latency value of the second route; and sending, by the client device, the second request via one of the first route or via the second route over the network based at least in part on the selecting.

16. The non-transitory computer-readable medium of claim 15, wherein the instructions are further executable to perform operations comprising:

sending, at a third time, a third request via the second route over the network, the second request comprising the identifier; and receiving, at a fourth time, a response to the third request that comprises the identifier.

17. The non-transitory computer-readable medium of claim 16, wherein the instructions are further executable to perform operations comprising:

determining, based at least in part on receiving the response to the third request, a difference between the third time and the fourth time.

18. The non-transitory computer-readable medium of claim 17, wherein the instructions for sending the second request via the first route or via the second route are further executable to cause the client device to perform operations comprising:

sending the second request via the first route based at least in part on determining that the difference between the third time and the fourth time is greater than the difference between the first time and the second time.

19. The non-transitory computer-readable medium of claim 17, wherein the instructions for sending the second request via the first route or via the second route further executable to cause the client device to perform operations comprising:

sending the second request via the second route based at least in part on determining that the difference between the first time and the second time is greater than the difference between the third time and the fourth time.

20. The non-transitory computer-readable medium of claim 15, wherein the instructions are further executable to cause the client device to perform operations comprising:

sending, at a third time, a third request via the first route over the network, the third request comprising a second identifier, wherein the first request is for the first type of data and the third request is for a second type of data different from the first type of data.

* * * * *